INVENTORS
S. H. JONES
R. A. ALLWOOD
G. BUNDZA
BY Holcombe, Wetherill + Brisebois
ATTORNEYS INVENTORS
S. H. JONES
R. A. ALLWOOD
G. BUNDZA
BY
Holcombe, Wetherill & Brisebois
ATTORNEYS United States Patent Office 3,418,150
Patented Dec. 24, 1968

3,418,150
METHOD AND APPARATUS FOR PREHEATING,
MASKING AND COATING AN ARTICLE
Samuel H. Jones, Kempston, Ronald Alfred Aliwood, Newport Pagnell, and Gunas Bundza, Bromham, England, assignors to Ashdown Brothers & Company (Engineers) Limited
Filed Feb. 17, 1965, Ser. No. 433,336
Claims priority, application Great Britain, Feb. 18, 1964, 6,671/64
9 Claims. (Cl. 117—38)

ABSTRACT OF THE DISCLOSURE

A method and apparatus for coating portions of an article with a fluent coating is disclosed. The article is attached to a movable support member throughout the operation. The movable support member and article are conveyed to respective positions at which the article is preheated, masked by an inflatable masking member, and coated by immersion, while masked, in a fluent material.

Figure 1:
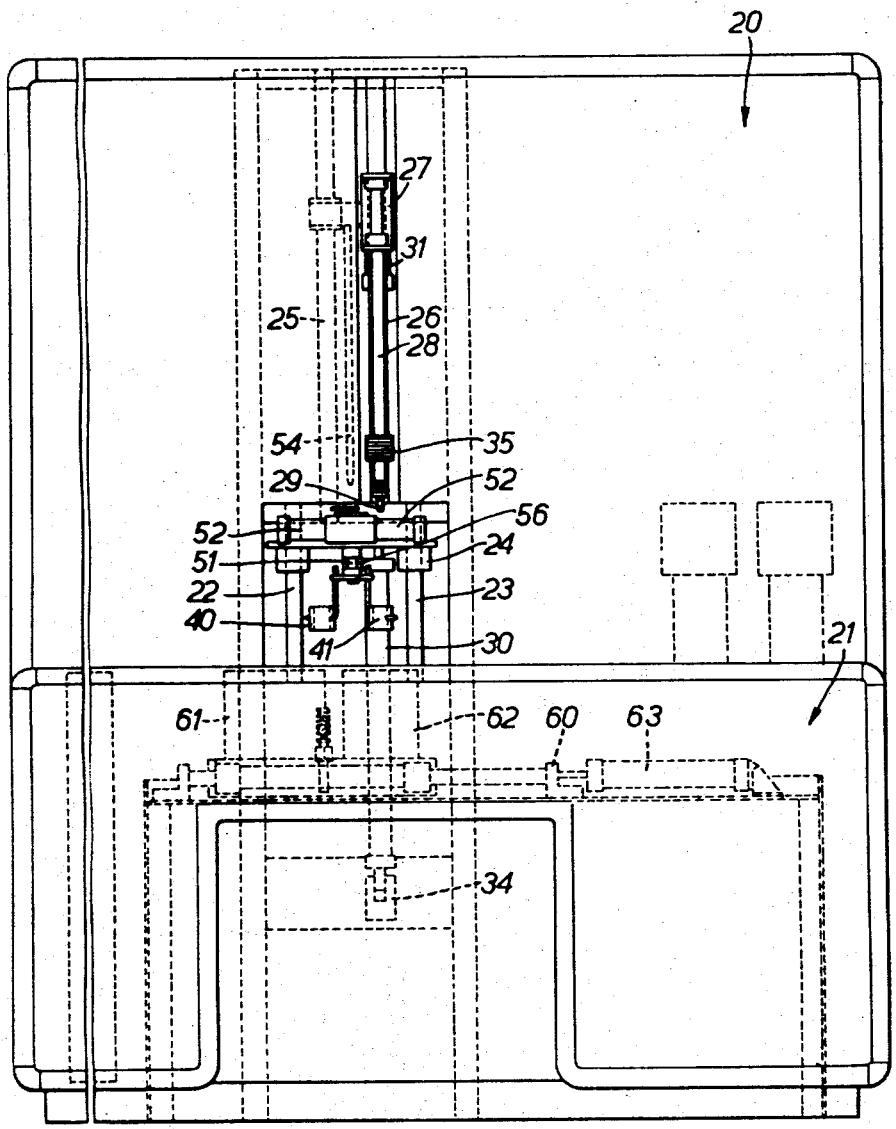

This invention relates to the coating of the surfaces of articles with a coating material and provides an improved method of and means for this purpose.

The invention has particular, though not exclusive, application to the coating of articles by a fluidised bed coating process, in which coating material in granular or like form is rendered fluid by a stream of air passed through it; the article to be coated being then enabled, by the fluidity of the material, to be immersed in the coating material. The coating material can be thermosetting or hermoplastic, or a composite material using a thermosetting or thermoplastic material as a binder, in which case it is often convenient for the article to be appropriately heated before being immersed in the fluid coating; the heat of the article may then cause the material to adhere to it, and start the polymerisation of the material. In this and similar coating processes it it required from time to time to coat parts only of the exposed surfaces of the article leaving some parts of the surfaces uncoated. The present invention has for its object to provide a method and means by which localised coating can be effected.

Though of wider application, the invention is particularly suited to the coating of the rotors and stators of small electric motors, for producing a coating on the winding slot and end surfaces of a rotor, but preventing the deposit of coating material on the cylindrical external surface of a rotor, and on the internal and sometimes external, surface of a stator.

The invention includes a method of locally coating the surface of an article, which comprises locating said article with respect to a masking means, said masking means including an enclosure at least one wall of which is resilient, and means for varying the pressure within said enclosure thereby to move said wall, varying the pressure inside said enclosure to bring said wall into masking engagement wih a region of the surface of said article, applying coating material to said article to coat a surface of the article excluding said masked region thereafter again varying the pressure inside said enclosure to separate said wall and said region.

The invention includes an apparatus for coating an article locally, and including masking means for preventing coating of a region of the surface of the article, said masking means comprising a flexible masking member forming part of an enclosure the pressure within which is controllable to control the position of said member, means for controlling the pressure within said enclosure and thereby to bring said member into or out of masking engagement with the region of surface of the article to be masked, and means for moving said article and said masking means together relative to a supply of coating material.

The invention also includes an apparatus for coating an article locally and comprising an article support for moving a supported article between masking, heating and coating positions of said apparatus, a masking means at said masking position comprising a flexible masking member forming part of an enclosure, means for controlling a fluid fed to said enclosure whereby to control the pressure in said enclosure, and thereby to move said member in or out of masking engagement with the region of the surface of the article to be masked, and means for moving said article and said masking means together to said coating station.

Figure 2:
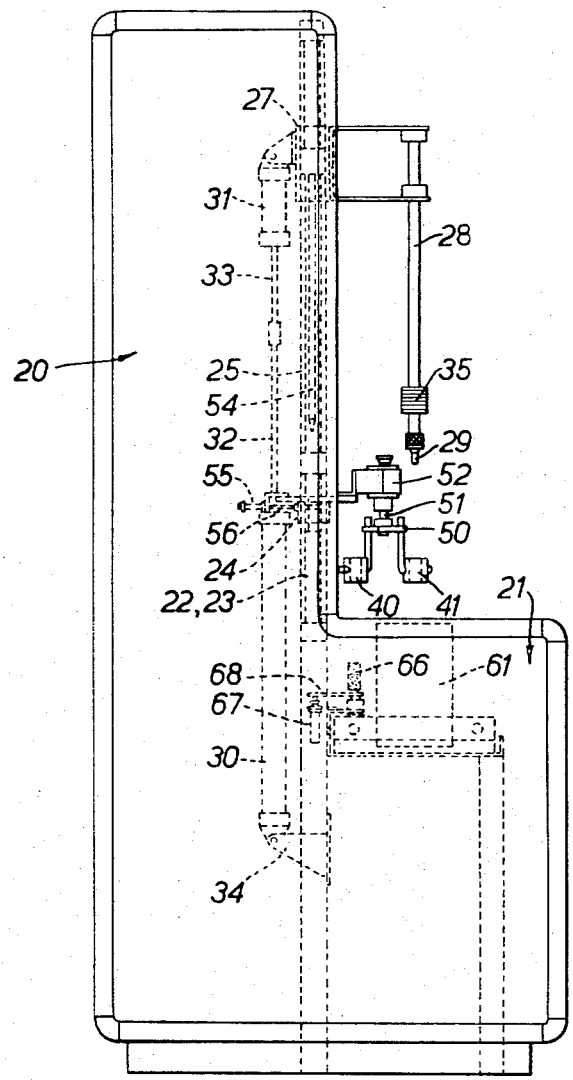
Figure 3:
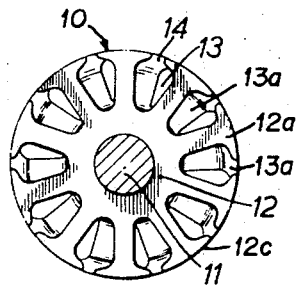
Figure 5:
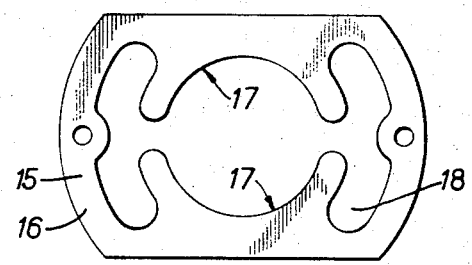
Figure 4:
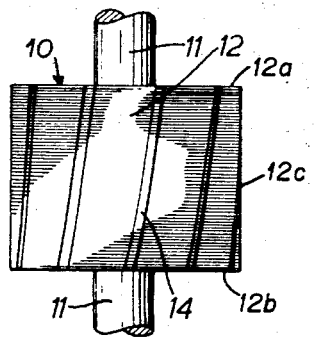
Figure 6:
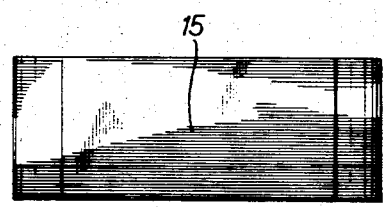
Figure 7:
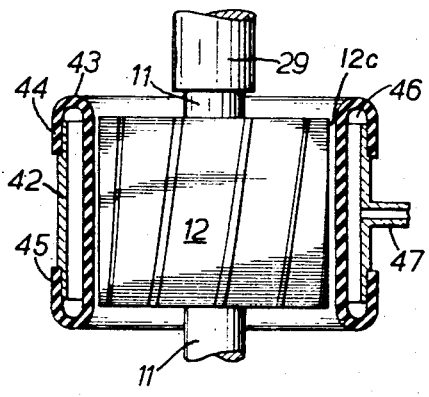
Figure 8:
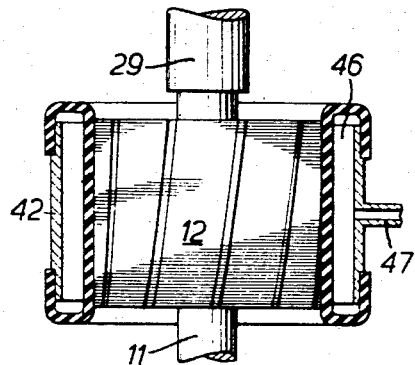

Features and advantages of the invention will appear from the following description of one embodiment thereof, given by way of example, in conjunction with the accompanying drawings in which:

FIGURE 1 is a simplified front elevational view of a coating apparatus;
FIGURE 2 is a side elevation of the same machine;
FIGURES 3 and 4 are respectively an end view and side elevation of the rotor of a typical small electric motor;
FIGURES 5 and 6 are similar views of a stator, and
FIGURES 7 and 8 are cross section views of a rotor, such as that of FIGURES 3 and 4 with the masking means ready for applying to the rotor, and applied to the rotor.

The machine shown in FIGURES 1 and 2 is intended for coating rotors of small electric motors. A typical rotor is shown in FIGURES 3 and 4. The rotor consists of a stack of laminations 10, assembled on shaft 11 to provide a cylindrical rotor 12. The laminations have a series of cut-outs which are approximately aligned in the rotor but staggered so as to provide helical or skewed winding slots 13. In coating such a rotor, it is desired to apply coating material to the interior surfaces of 13a of the openings and to the end surfaces 12a and 12b of the rotor; it is important that coating material should not be applied to the exterior cylindrical surface of the rotor at 12c. If this material is insulating, and of adequate thickness, it can replace the electrical insulating inserts conventionally used. Such a rotor might be used with the stator 15 shown in FIGURES 5 and 6, consisting of a corresponding stack of annular laminations 16 with a central cylindrical surface at 17 and winding slots defined by opening 18. The outer surface can be as shown, or it may be cylindrical. In the case of the stator, it is important that the surface 17 should not be coated. In coating the rotor 12, the gaps 14 which are defined by the edges of the slots 13 are comparatively narrow; this makes them difficult to mask by conventional masking means and there is also a tendency for coating material to bridge across the gaps.

In the embodiment of the invention about to be described, the coating material is an epoxy resin, applied in the form of powder; the rotor is first cleaned and is then heated by an induction coil and the outer cylindrical surface of the rotor is masked by a flexible sleeve.

With the mask in position the rotor is immersed in the resin powder, which is fluidised by air passed through it. The powder adheres to the desired surfaces of the rotor and the heat of the rotor causes partial polymerisation of the resin. The process is repeated until a desired thickness of coating resin has been built up.

The apparatus is housed within a cabinet 20, made of angle section metal and suitably panelled with a lower forwardly projecting part 21. In the centre of the cabinet is mounted a reciprocating assembly, including lower guide rods 22 and 23, on which is mounted a slide assembly 24 and upper guide rods 25 and 26, on which is another slide assembly 27. Slide 27 carries a work holder in the form of a rod 28 to the lower end of which the rotor to be coated is attached coaxially by means of an air operated chuck 29.

The slide 27 can be moved by means of two pneumatic actuators 30 and 31, the rams 32 and 33 of which are joined together. The cylinder of the lower actuator is supported at 34 from the structure of the cabinet whilst the cylinder of actuator 31 is attached to slide 27. By supplying air appropriately to actuators 30 and 31 the work holder 28 can be brought to any one of three positions. In the uppermost of these positions, the work piece lies within the turns of an induction heating coil 35; in the second position the work piece will be below the coil and in the third position the work piece will have moved downwardly into a coating position below the top of the front part 21 of the cabinet.

Mounted on the slide 24 is a masking assembly comprising two cylindrical mask assemblies 40 and 41, of which one is shown diagrammatically in FIGURES 7 and 8. An outer metallic sleeve 42 has an internal diameter rather larger than the external diameter of rotor 12 and this sleeve is lined with another sleeve 43 of heat-resisting flexible material, having a low coefficient of friction, such as silicone rubber. The outer edges of this sleeve are turned back and sealed to sleeve 42, as at 44 and 45 and this forms a sealed space 46; pipes 47 gives access to space 46. With positive pressure within space 46, sleeve 43 can be brought into intimate contact with the cylindrical surface of rotor 12, as indicated in FIGURE 8. There is a slight tendency for the sleeve 43, being flexible, to bulge into the gaps 14 and this is advantageous in minimising the possibility of any coating material building up beyond the diameter of the cylindrical surface 12c of the rotor, and also reduces any tendency to form bridges of coating material across the gaps. When pressure within space 46 is reduced, or is made negative, the sleeve will again increase its internal diameter sufficiently to enable it to be removed easily from the surface of the rotor. It may be convenient to have two pipes 47, in communication with the space 46, on opposite sides of sleeve 42 and to pass cooling fluid, such as gas, air or water, through the space 46. The desired change of pressure within space 46 can then be obtained by adjusting the relevant inlet and outlet pressures of the cooling fluid.

The two masking devices 40 and 41 are similar in construction and are carried upon a cross member 50 mounted on a rotatable shaft 51, which can be reciprocated angularly between two positions about 180° apart by means of a pneumatic double-acting actuator 52. The two masking devices can thus be brought alternatively into a position in which one masking device is coaxial with the worker holder rod 27. The supply of air to actuator 52 can be controlled by means of limit switches, not shown, operated by a cam on shaft 51.

It can be arranged that the slide 24 is moved downwardly or not, as desired, by movement of the upper slide 27. For this purpose an operating rod 54 is attached to the upper slide 27 and passes through an opening in the lower slide 24. An auxiliary actuator 55 is provided by means of which an obstruction 56 can be interposed into the path of the coupling rod 54, whereupon downward movement of slide 27 will cause downward movement of slide 24.

In the forward part 21 of the cabinet is arranged a slide mechanism 60 carrying two tanks 61 and 62. Tank 61 is intended to hold the epoxy resin powder; an electromagnetic vibrator is associated with the tank to vibrate the powder. A mechanical or pneumatic vibrator can be used. The floor of tank 61 is of a porous material such as ceramic tile, or expanded polystyrene or other plastic, and dry, clean air from a suitable source within the cabinet, not shown, is fed under pressure to a plenum chamber beneath the floor. When air is supplied in this way the volume occupied by the powdered resin is substantially increased, and the powder is fluidised, that is, it takes on properties resembling those of a liquid, and in practice resembles a boiling liquid. This enables an article such as the rotor to be at once immersed in the fluidised powder and be surrounded by it, with little more resistance than would be encountered in imersing the rotor in a true liquid. This fluidised condition of the powder will exist only while the air continues to pass through the powder. Thus, the condition is difficult to maintain above flat unbroken horizontal surfaces, but on the other hand the fluidised material will flow freely through the vertical winding slots of the rotor, and the flow over the upper surface of the rotor is adequate. However, depending upon the size of the article being coated, this tendency of the fluidised material to collapse when the air flow is diminished in any way may lead to a slight excess of coating or free powder on the top surface of the article. If this problem is encountered a suction tube located over the top of the article can be used to remove any excess powder. Alternatively the article can be vibrated on its support.

Tank 62 is for a cleaning fluid; one or more ultrasonic vibrators are included in the tank, by means of which the work piece to be coated can be wiven a preliminary ultrasonic cleaning. The tanks 61 and 62 can be brought alternatively into position below the axis of the work holder rod 28, under the control of a pneumatic actuator 63.

In the cycle of operation of the device, the operator first attaches the shaft 11 at one end of a work piece to the air chuck 29 to the end of rod 28, and places a suitable mask, such as a rubber cup on the other, lower end of shaft 11; the machine is then switched on. Actuator 63 is in a position such that tank 62 is beneath the rod. Air is supplied to actuators 30 and 31 and the work piece is lowered into the tank 62 and is ultrasonically cleaned, whereafter the work piece is withdrawn to an upper position, in which the work piece is within coil 35; the work piece is accordingly heated. The induction power source is conveniently arranged in the left hand upper part of the cabinet. After a time sufficient to raise the temperature of the work piece at least to the fusion temperature of the resin, the rod 28 is lowered until the work piece is within one of the masking devices 40, 41. Water is fed through flexible connections, not shown, to that one of the masking devices into which the work piece is inserted, so that sleeve 43 expands in intimate contact with the outer surface of the work piece. The actuator 55 imposes the obstructing means 56 below the end of coupling rod 54. On appropriate supply of air to actuators 30 and 31 the heated and masked work piece is now lowered into the tank 61 containing the fluidised resin powder. The powder flows freely up through the winding slots in the rotor and also covers the top end face of the rotor. The heat of the rotor causes the resin in contact with the rotor to soften, and a film of the powder adheres to the exposed surfaces of the rotor. This film is continuous, and the heat of the rotor is sufficient to start the polymerisation of the resin.

In most cases it will be desirable to give two or more coatings to the rotor, in order to build up an adequate thickness of coating. Accordingly, the now partly coated article is again heated by being placed in position in coil 35 and the cycle of operation is repeated, save that no further cleaning of the work piece is necessary.

It is desirable to avoid build-up of resin on the masking device, and it is therefore arranged that when the slide 14 is at its lowermost position that of the two masking devices that one which is not in use engages brush 66 which cleans the inside surface of the mask. Brush 66 is rotated continuously by a small air motor 67 through a belt drive 68. This cleaning action can be assisted by expansion or contraction, or both, of the sleeve.

When an adequate thickness of resin has been built on the rotor, the rotor can be detached from the work holder and planted on a suitable conveyor to pass it through an oven for final curing.

The finished rotor has an adequately thick and uniform coating of resin upon the desired surfaces, making it possible to wind the rotor windings directly on the core without the use of the further insulations customarily used.

It also occurs that when an adequate thickness of resin has been built up, the surface tension effects of the resin when in a fluid condition on the rotor results in a rounding off of the coating adjacent the sharp edges of the rotor laminations. If the windings of the rotor are wound directly on the rotor, this rounding is of advantage in reducing the minimum radius to which the wire of the winding has to be bent when being wound in the rotor slots.

The machine described can be modified for use with motor stators, such as a stator shown in FIGURES 5 and 6 of the drawings. It will be seen that with the stator it is the interior cylindrical surface 17 which has to be masked and a suitable mask can be provided by using an inverted form of the mask shown in FIGURES 7 and 8, in which the sleeve 43 of rubber is arranged on the outside of the metallic sleeve 42, with pipe 47 admitting to the inside surface of sleeve 42. In operation, increased pressure to the space 46 will cause the surface of the sleeve to expand and engage the surface 17; release or reduction of pressure will disengage the sleeve from the surface.

It may be desired to mask the outer surface of the stator. In some cases this may be truly cylindrical, when a mask similar to that of FIGURES 7 and 8 can be used but of appropriately larger diameter. A stator such as that shown in FIGURES 5 and 6 can be masked by means of a mask of similar, but non-circular construction. Alternatively, more elaborate assemblies of masks can be made and a plurality of masks can be used in coating a single article.

In using two or more masks with a single article, it may be convenient to inflate the masks independently or consecutively, or at different positions of the work holder chuck, so as to facilitate assembly of the article and the masks.

The embodiment of the invention described can be modified in several ways. For example, the ultrasonic cleaning may not be necessary if the workpiece is initially clean. Also, instead of heating the workpiece before imersion in the fluidised coating, it can be heated, by induction heating, when masked or when immersed in the fluidised coating. In the latter case, sleeve 42 is made of low conductivity material, and may be of the same material as sleeve 43. It can also be arranged for the workpiece to be supported solely by the sleeve during coating.

The invention can obviously be used to coat other articles, such as resistors, capacitors, switchbars and bottles.

We claim:

1. A method of locally coating the surface of an article with a fluent coating material which comprises the steps of:
   securing said article to a movable support member;
   moving said support member to transfer said article to a heating position;
   moving said support member to transfer said article to a masking position in which it is predeterminedly located with respect to an enclosure having a resilient wall;
   masking said article at said masking position by varying the pressure inside said enclosure to bring said wall into masking relationship with a surface of said article;
   and moving said support member, said heated article and said masking means together to a coating position thereby to immerse said heated masked article in a fluent coating material adherent to said heated article.

2. The method claimed in claim 1 wherein said support member is linearly reciprocated between said heating, masking and coating positions.

3. An apparatus for coating an article locally with a fluent coating material adherent to a heated surface of said article, said apparatus comprising in combination:
   an article support member; actautor means operable to move said article support member reciprocally between respective heating, masking, and coating positions of said apparatus;
   heater means at said heating position operable to raise the temperature of an article carried by said article support member;
   a mask support member movable between said masking position and a coating position of said apparatus, said masking means comprising a flexible masking member forming part of an enclosure, means for feeding a fluid to said enclosure, means for controlling the flow of fluid to said enclosure whereby to control the pressure in said enclosure and thereby to move said masking member into or out of masking engagement with the surface to be masked of an article carried on said article support member at said masking position;
   container means at said coating position capable of maintaining said coating material in a fluent condition; further actuator means operable to move said article support member reciprocally between said masking and coating positions;
   and coupling means operable to produce coupled movement of said article support member and said mask support member between said masking and coating positions whereby to immerse said heated masked article in fluent coating material in said container whereby unmasked surfaces of said article are coated with said material.

4. The apparatus claimed in claim 3 wherein said flexible masking member forms at least part of an annular structure capable of embracing part of the article.

5. The apparatus claimed in claim 4 wherein said flexible masking member is sleeve-like and is attached to an annular support member and with it forms said enclosure.

6. The apparatus claimed in claim 5, for coating a surface other than the interior surface of an article, wherein said flexible member is disposed within said annular support member.

7. The apparatus claimed in claim 3, including a reservoir of cleaning fluid and means for alternately positioning said reservoir and said container in said coating position whereby to effect cleaning of said article before said immersion.

8. The apparatus claimed in claim 3 including a plurality of said masking means carried by said mask support means, said mask support means being movable about an axis to bring said masking means sequentially into said masking position and into an inoperative masking means position.

9. The apparatus claimed in claim 8 including at said inoperative masking means position brush means to effect cleaning of said masking means at said position.

(References on following page)

References Cited

UNITED STATES PATENTS

| | | | |
|---|---|---|---|
| 836,415 | 11/1906 | Toy | 117—38 X |
| 3,034,479 | 5/1962 | Larsh et al. | 118—505 X |
| 3,136,650 | 6/1964 | Avila | 117—21 |
| 3,185,131 | 5/1965 | Manning | 117—21 X |
| 3,250,643 | 5/1966 | Sergent. | |
| 3,291,630 | 12/1966 | Deyle et al. | 117—18 |
| 3,296,999 | 1/1967 | Gamble | 118—322 X |

ALFRED L. LEAVITT, *Primary Examiner.*

R. L. BROWDY, *Assistant Examiner.*

U.S. Cl. X.R.

118—406, 505; 117—18, 47